Dec. 14, 1954  H. L. BARBER ET AL  2,696,816
SPATTER-PROOF, VENTED FRYING PAN LID
Filed May 7, 1952
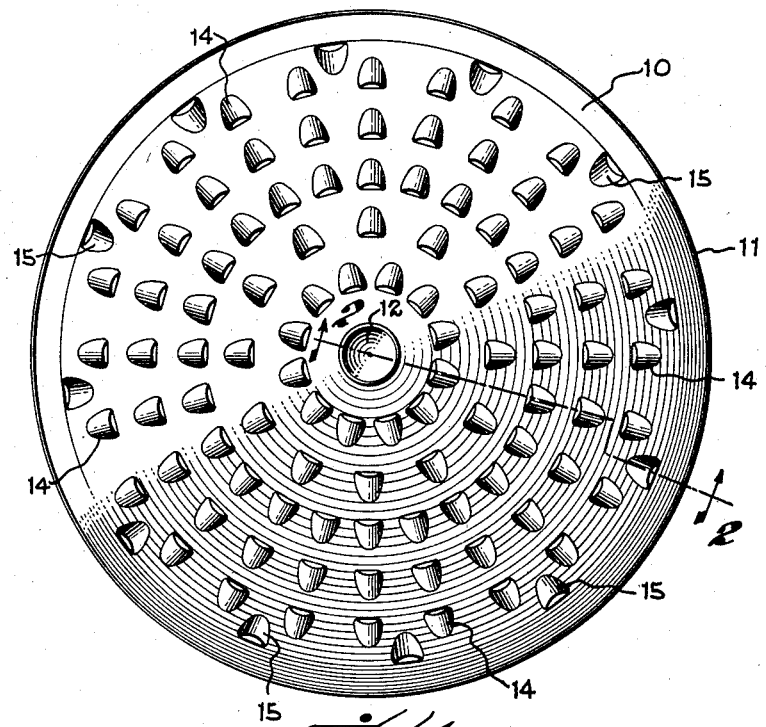
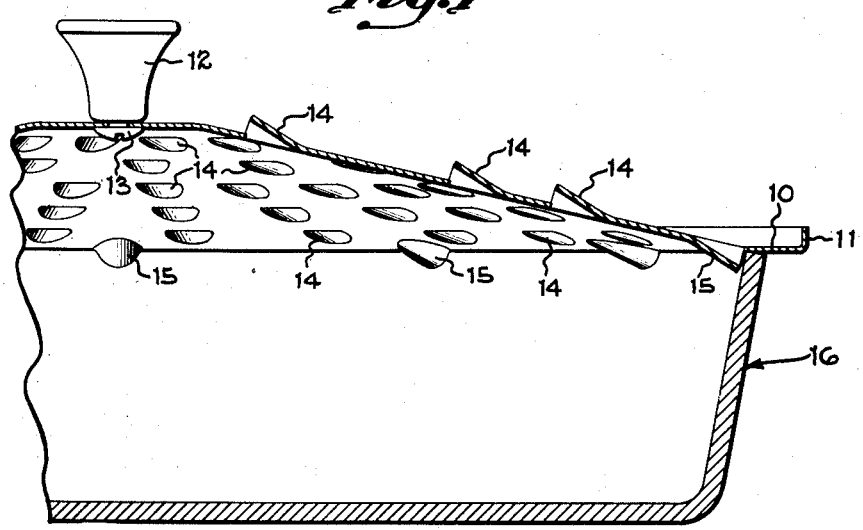
INVENTORS.
Hiram L. Barber.
BY George L. Sellars.
Wood, Herron & Evans.
ATTORNEYS.

United States Patent Office 2,696,816
Patented Dec. 14, 1954

2,696,816

SPATTER-PROOF, VENTED FRYING PAN LID

Hiram L. Barber, Newtown, and George L. Sellars, Milford, Ohio

Application May 7, 1952, Serial No. 286,504

1 Claim. (Cl. 126—384)

This invention concerns an improved cover for a skillet or frying pan which is designed to permit the ready escape of the steam and other vapors produced by frying, thereby insuring proper browning, as contrasted with stewing, of the food being fried, but at the same time to keep grease from spattering out upon the stove or upon the person using the skillet.

The principle of the cover is not new. It has been proposed that specially designed, vented absorbent discs be incoporated in a frying pan cover for this purpose. However, this is a rather expensive way of accomplishing the end sought because a new disc is required each time that the cover is used. Then too, the spattered grease, being absorbed by the disc is lost from the pan along with the steam, and unless it is replaced, burning, rather than browning is likely to occur.

The object of the present invention is to provide an inexpensive metal lid which is designed to accomplish the purpose set forth; and further, one which is designed so that it can be easily washed or scoured after use. Additionally, it is an object to provide a frying pan lid of the type described which is constructed so that it can be formed by simple stamping or dieing operations.

Other objects and features of the invention will be apparent from the detailed description of the drawings in which:

Figure 1 is a top plan view of a frying pan lid embodying the principles of the present invention.

Figure 2 is a fragmentary cross sectional view taken on the line 2—2 of Figure 1.

In the preferred embodiment the lid is made from sheet aluminum, although it will be understood that other metals can be used. The lid is generally in the shape of a shallow cone, slanting upwardly from the rim toward the center. The outer rim area itself, indicated at 10, is flat and may be made sufficiently wide to accommodate frying pans of different diameters. The margin of the rim is turned up as at 11 to provide an annular flange, the flange strengthening the rim and also serving a grease retaining function to be described below. A knob handle 12 of conventional design is secured to the center of the lid by means of a bolt 13, which passes up through the lid, threading into the knob.

The lid area between the knob handle 12 and the rim area 10 is vented by a plurality of small, half cup-like or louver-like vents 14. The particular louver design shown has the advantage that there are no sharp corners which might be likely to make cleansing difficult. The louver-like vents may be disposed about the center of the lid in a symmetrical pattern as shown in Figure 1, or they may be placed at random. It is preferred that the louver openings should all face, or substantially face, the center of the lid. Or putting it another way, in the preferred embodiment the louvers are disposed upon radial lines and open substantially toward the lid handle. Preferably, all of the louvers between the rim and knob are formed so that they extend upwardly from the upper surface of the lid. However, spaced around the rim area there is a plurality of similar louver-like vents 15, which vents depend from the under side of the lid. The latter vents, being adjacent the flat rim area 10, serve to center and retain the lid upon a frying pan such as the one shown fragmentarily at 16 in Figure 2. Of the two different types of louver-like vents 14 and 15 the former have their external openings on the upper side of the pan lid, with these openings oriented to face the center or handle of the lid. The latter vents identified by the numeral 15 have their external openings facing radially outwardly from the center of the lid. In this sense, it may be said that the "external" opening of a vent is the opening defined by the free or exposed edges of the pan lid material at the vent.

The plurality of louver-like vents 14 permits the ready escape of steam produced by frying, but at the same time, prevents the grease from spattering out of the pan. Practically all of the grease spattering upon the underside of a louver is caught by the louver itself, however, should any grease fly out of the opening at a louver, in the preferred embodiment, it would necessarily have to be flying in the direction of the handle 12, that is, toward the center of the lid. Thus, in order for grease to spatter out upon the stove or a person using the skillet it would have to pass through one of the openings in the vents 14 and then clear over one-half of the diameter of the lid. It is quite unlikely that this would ever occur. Further, should a considerable amount of grease spatter out through the openings of the vents onto the top of the lid it would be caught by the marginal flange 11. Such grease would then drain through the depending vents 15 back into the skillet. The vents 15 thus perform a double function, that of serving as centering means for holding the lid upon a skillet, and the drainage function just described.

It is anticipated that louver constructions other than the specific one shown in the drawings might be employed for venting a frying pan lid to perform the functions of the one illustrated in the drawings. By way of example only, the louvers might be made considerably longer and less high, with slit-like openings provided. It is obvious that other changes and modifications may be made in the details of construction without departing from the spirit of the invention.

The lid design shown is adapted to be formed as a cast construction. Also in a cast construction, the vent passageways could be formed by drilling holes at an angle with respect to the vertical axis of the lid. Additionally, where small vent openings are provided, such openings could open radially outwardly, or substantially circumferentially if desired, provided there be sufficient angulation within the passageways themselves to catch spattered grease or at least prevent it from passing freely through the passageways.

Having described our invention, we claim:

A frying pan lid, said lid being generally circular and higher at the center than at the periphery thereof, a substantially flat annular marginal area adjacent the periphery of said lid, a flange turned upwardly from the periphery of the lid, a multiplicity of louver-like vents formed in said lid inwardly of the flat annular marginal area thereof, said vents extending upwardly from the upper surface of the lid and oriented with their external openings facing the center of the lid, and additional louver-like vents depending from the under surface of the lid at points spaced circumferentially of the lid and adjacent the periphery thereof, the latter named vents oriented with their external openings facing radially outwardly with respect to the center of the lid to serve as centering means to hold the lid upon a pan to serve as means to drain the flat marginal area of the pan lid.

References Cited in the file of this patent

UNITED STATES PATENTS

| Number | Name | Date |
|---|---|---|
| D. 142,977 | Archer, Jr. | Nov. 27, 1945 |
| 65,614 | Shaler | June 11, 1867 |
| 1,414,540 | Young | May 2, 1922 |
| 1,470,281 | Mohlman | Oct. 9, 1923 |
| 1,477,981 | Sechler | Dec. 18, 1923 |
| 2,002,237 | Roland | May 21, 1935 |

FOREIGN PATENTS

| Number | Country | Date |
|---|---|---|
| 20,030 | Great Britain | A. D. 1909 |